United States Patent [19]
Bingham

[11] 4,278,836
[45] Jul. 14, 1981

[54] REPAIR COUPLING FOR FLEXIBLE ELECTRICAL CONDUIT

[76] Inventor: Loran S. Bingham, 3571 Oceanview Ave., Mar Vista, Calif. 90066

[21] Appl. No.: 942,606

[22] Filed: Sep. 15, 1978

[51] Int. Cl.³ .............................................. H02G 1/16
[52] U.S. Cl. ................................. 174/84 S; 174/84 C; 174/109; 29/402.09; 403/294; 403/296; 285/32
[58] Field of Search .................... 174/84 S, 109, 84 C, 174/83; 403/296, 292, 294, 405, 407, 408; 29/628, 401 E, 401 C; 285/31, 32, 419, 373

[56] References Cited
U.S. PATENT DOCUMENTS

| | | | |
|---|---|---|---|
| 848,819 | 4/1907 | Freeman | 174/83 UX |
| 1,808,542 | 6/1931 | Ginsburg | 174/83 |
| 3,728,473 | 4/1973 | Kuo | 174/84 C |

Primary Examiner—Roy N. Envall, Jr.
Attorney, Agent, or Firm—William H. Maxwell

[57] ABSTRACT

A repair coupling for flexible electrical conduit comprised of helically wrapped loosely interlocked metallic strip, said coupling being characterized by its initially enlarged arcuate cross section adapted to be constricted into tube form, the interrupted perimeter of the initial cross section providing an opening longitudinally coextensive with the coupling body for the lateral reception of wires, the body being reformed to have a continuous circumference of predetermined diameter for threaded engagement into the conduit sections joined thereby.

10 Claims, 12 Drawing Figures

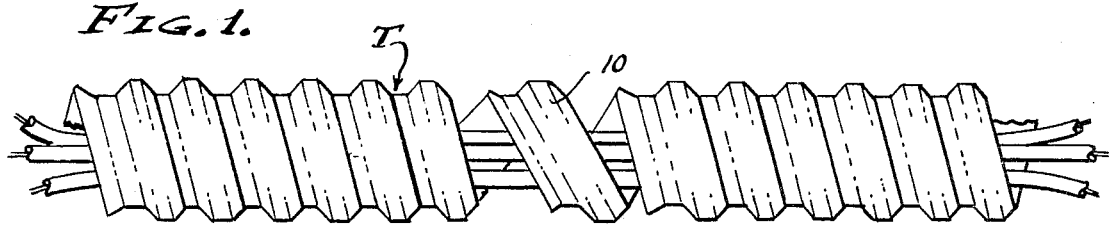
FIG. 1.
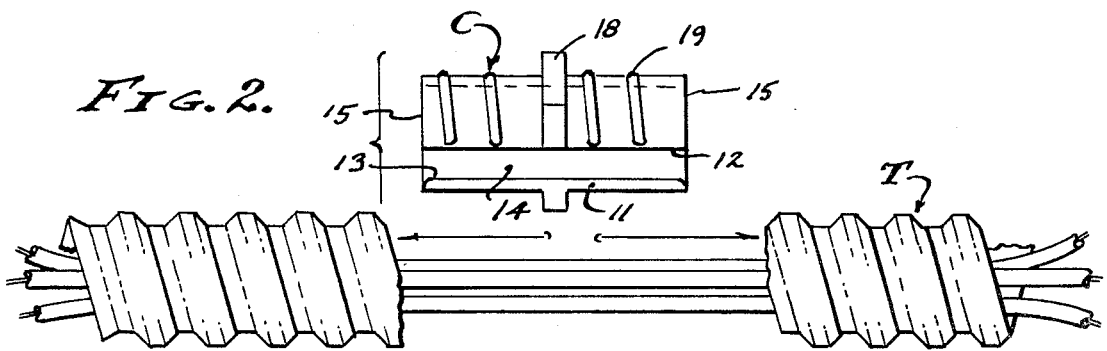
FIG. 2.
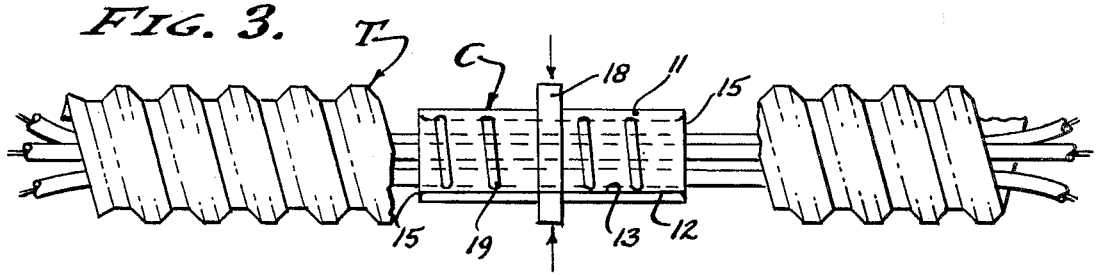
FIG. 3.
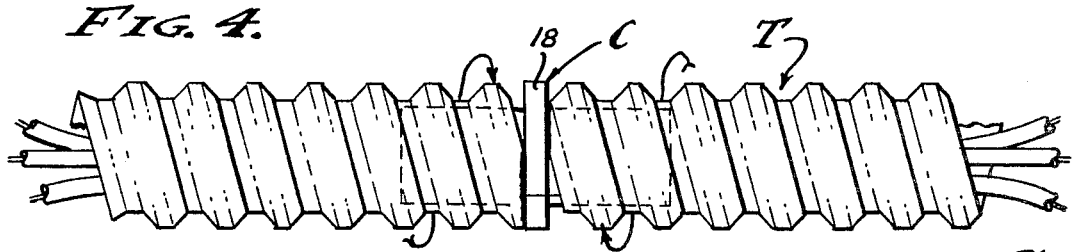
FIG. 4.
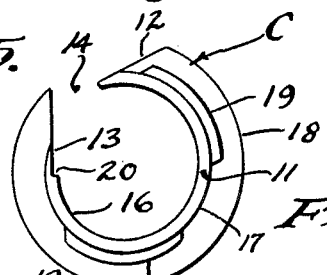
FIG. 5.
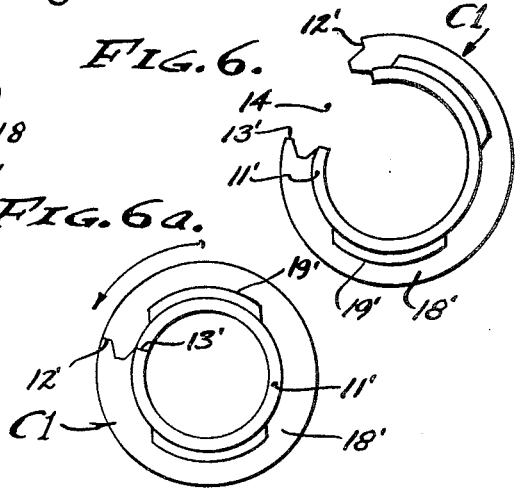
FIG. 6.
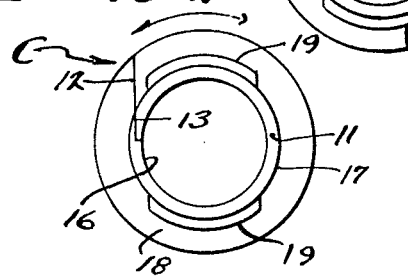
FIG. 5a.
FIG. 6a.

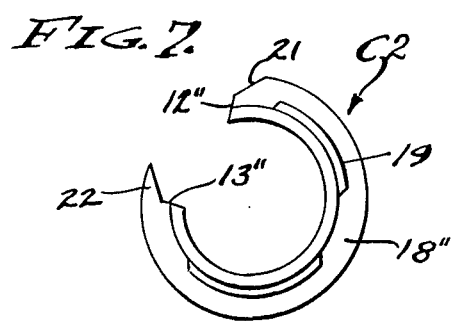
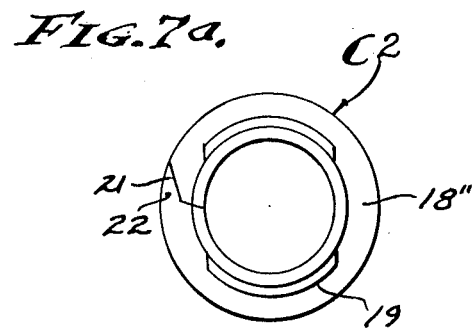
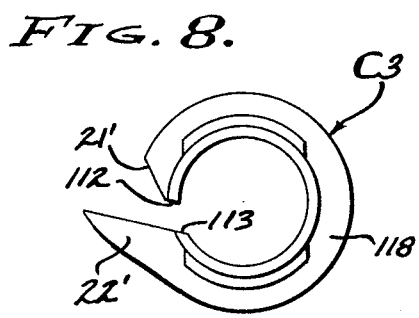
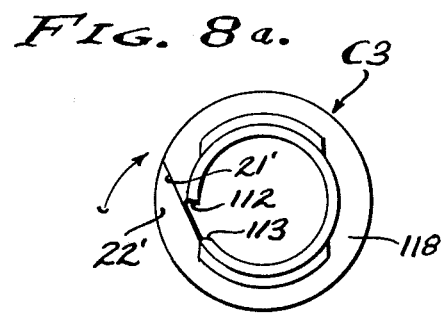

REPAIR COUPLING FOR FLEXIBLE ELECTRICAL CONDUIT

BACKGROUND

This invention relates to the installation of electrical conduit of the flexible type, and particularly to the repair of damage thereto as by means of inserting couplings in order to rejoin ruptured sections thereof. Flexible electrical tubing, referred to herein as "flex conduit" is comprised of an interlocked helex of metal strip, soft steel or aluminum that is easily cut and workable. The interlock is by means of a formed cross section of the strip wherein the two margins thereof are faced inwardly and outwardly for interengagement respectively; specifically an inwardly faced channel engageable over an outwardly turned flange loosely related for flexibility. The purpose of such tubing or conduit is of course the protection of the insulated wiring drawn therethrough between junction boxes where electrical connections are made, the metallic conduit and junction boxes providing ground continuity. Accordingly, the installation of flex conduit involves various tubular fittings by which the sections thereof are joined together and into junction boxes and the like, making up a permanent installation secured into the framework of buildings and other such structures. The electrical wiring is then pulled through the various runs of flex conduit to service the various fixtures and outlets, involving switches etc.

Construction difficulties arise in the acceptance of the aforesaid electrical installations, since damage may occur thereto prior to final inspection after which the installation will be enclosed permanently within the building structure. For example, there are other trades performed in the construction of a building and during which the activities of workmen often damage sections of the flex conduit; by over bending it or crushing it and as the result of various unpredictable accidents. Nevertheless, the result is most often a simple separation of a convolution or two of the flex conduit, as it is illustrated in FIG. 1 of the drawings herein. Needless to say, the electrician or tradesman who previously completed the installation is now obligated to make a repair which heretofore has been time consuming and costly; since the wiring had to be pulled out in order to cut the flex conduit and then insert a tubular coupling followed by rewiring. Therefore, it is a general object of this invention to provide a repair coupling for flexible electrical conduit, which enables repair of damaged sections thereof without removal of the previously installed wiring. Accordingly, a great deal of time and expense is saved, avoiding any destruction and/or reconstruction of work accomplished, including other trades which might be affected.

Prior art couplings are typically of tubular form, and those for joining the abutted ends of flex conduit are complete right cylinders fitted into the open ended abutted conduits and with thread members to engage the helical convolutions of the conduit. In practice, these prior art couplings are molded or die-cast of metal, over a core about which two mold halfs operate to form a solid tube coupling body. It is this solid tube body of the prior art which requires removal of wiring before insertion thereof can be made, and in accordance with this invention it is an object to avoid that removal procedure by providing lateral access through the wall of the coupling. Accordingly, the repair coupling of the present invention is separated longitudinally for reception of the wires laterally therethrough and adapted to be closed for passage of the wires longitudinally therethrough, all without removal of the previously installed wires.

It will be seen that the repair coupling of the present invention has an initial formation for the reception of wiring, and a reformed condition for the permanent passage of wiring therethrough. It is therefore an object to provide a workable coupling body which is adapted to be reformed from its manufactured configuration, to form a protective tube as is required. Accordingly, this repair coupling is made of a malleable metal which can be pressed in order to close the lateral opening initially provided therein.

Further, it is an object to provide a longitudinally disposed separation which is conducive to the existent methods of manufacture involving a core about which two mold halfs operate, the coupling body being molded to an enlarged configuration from which it is constricted with a pliers, or special tool, to the closed configuration (compare FIGS. 5 and 5a).

Still further, it is an object to provide control over the diameter to which the coupling body can be constricted, the opposed edges of the longitudinal separation being formed so as to mate in register and thereby prevent radial displacement while preserving a positive stop to constriction (compare FIGS. 6 and 6a). Alternatively, only a portion of the coupling body is reformed to overlap and namely the separating flange as shown in FIGS. 7 and 7a wherein the entire coupling body is reformed to close, or as is shown in FIGS. 8 and 8a wherein the separating flange only is reformed with the opposite end portions of the coupling body remaining slotted.

SUMMARY OF INVENTION

The repair coupling disclosed herein is a malleable metal member, and in addition to all of the features and advantages of prior art tube couplings of this type is characterized by its unique enlarged and slotted configuration that provides a lateral opening through which wiring is received, after which it is closed and the wiring protected. With the present invention, the damaged flex conduit can be separated and trimmed to have normally abutted ends (see FIG. 2), and the repair coupling constricted over the wire inserted therein to form a closed tube (see FIG. 3) having an outer diameter threadedly received in the abutted conduit ends respectively (see FIG. 4). The separated edges of the coupling body are mated so as to have abutted or overlapped engagement, and preferably notched or of tongue and groove form so as to have registered alignment. The constricted diameter of this repair coupling is predetermined so as to prevent collapse and to pass the wiring without obstruction. Accordingly, the installed repair coupling presents an elongated right cylinder tube form, having external threads at opposite end portions separated by a flange abuttment. The characteristic feature of this repair coupling is its initial longitudinal separation coextensive from end to end and which is subsequently closed by reformation to a predetermined diameter.

DRAWINGS

The various objects and features of this invention will be fully understood from the following detailed description of the typical preferred forms and applications thereof, throughout which description reference is made to the accompanying drawings, in which:

FIG. 1 is a side elevation of a section of flex conduit which has been damaged, as evidenced by a separated convolution thereof.

FIG. 2 is a view similar to FIG. 1 showing removal of the damaged convolution, trimming thereof, and longitudinal separation for the reception of the repair coupling over the existent wiring.

FIG. 3 is a view similar to FIG. 2 showing the repair coupling closed over the existent wiring.

FIG. 4 is a view similar to FIG. 3 showing the abutting ends of the separated flex conduit threaded onto the opposite end portions of the closed repair coupling.

FIGS. 5 and 5a are end views of the repair coupling in its basic form, FIG. 5 showing the initial manufactured form and FIG. 5a showing the reformed closed condition thereof.

FIGS. 6 and 6a are end views of a second form, FIG. 6 showing the manufactured form and FIG. 6a showing the reformed closed condition thereof.

FIGS. 7 and 7a are end views of a third form, FIG. 7 showing the manufactured form and FIG. 7a showing the reformed closed condition thereof. And, FIGS. 8 and 8a are end views of a fourth embodiment wherein the flange only is reformed.

PREFERRED EMBODIMENT

This repair coupling C is specialized for joining the open abutting ends of flex conduit T through which wiring has been previously installed, for example to repair a completed conduit installation that has been damaged so as to expose the wiring. Thus, three factors are involved; the run of flex conduit T, the presence of wiring enclosed therein, and the necessity of a coupling suitable to repair the break. It is to be understood that the length of a conduit run can vary from a few feet to many feet, and the number of wire conductors can vary from one to many (three are shown). The typical break or separation shown in FIG. 1 illustrates the exposure of wiring which is corrected by the installation of this repair coupling, as illustrated in FIG. 4 effecting complete enclosure of said wiring.

The flex conduit involved herein is comprised of a metallic strip formed to have inwardly and outwardly disposed marginal configurations loosely interengaged in a helex, so as to present relatively moveable interlocked convolutions. As shown in FIG. 1, excessive force or abuse can disengage adjacent convolutions and stretch a connecting convolution 10 therebetween. It is this connecting convolution 10 which is severed and/or trimmed and cut out in accordance with this invention as best illustrated in FIG. 2 of the drawings where the separated portions of the flex conduit are shown separated for the reception of this repair coupling over the wiring that is exposed.

Referring now to the repair coupling C, an article of manufacture is provided in the form of an elongated sleeve 11 of arcuate cross section having coextensive opposed edges 12 and 13 forming a slot-shaped opening 14 to receive wiring. The ends 15 of the sleeve 11 are normal to the axis about which the inner and outer walls 16 and 17 are formed, the sleeve being a thin-walled shell with walls 16 and 17 of uniform thickness. The opposed edges 12 and 13 are separated in parallel relation to receive and pass a run of wires which are individually manipulated therethrough to be embraced by the sleeve. A center flange 18 projects from the outer wall 17 to abut the ends of the flex conduit that are brought together into engagement thereat by means of thread members 19 on the opposite end portions of the sleeve. In practice the thread members 19 are segments of different pitch than the flex conduit convolutions, so as to have a jambing or locking effect.

The embodiment of FIGS. 5 and 5a illustrates the enlarged periphery of outer wall 17 which is constricted to a circumference that revolves within the inner diameter of the flex conduit T so that the thread members 19 are threadedly engageable therein as shown in FIG. 4. It is to be understood that the edges 12 and 13 can vary in form and/or configuration, it being preferred that they have opposed engagement when the sleeve 11 is constricted as is shown in FIG. 5a. For example, the edges 12 and 13 of the sleeve are divergent in their initially separated form of the enlarged sleeve as shown in FIG. 5, and adapted to have substantially flat interface engagement when the sleeve is constricted into right cylinder form as shown in FIG. 5a. In carrying out this invention the edge 13 can extend tangentially from inner wall 16, and the edge 12 outwardly divergent therefrom. Further, a stop shoulder 20 can be provided to engage the inner point of edge 12 to limit the predetermined inner diameter of the reformed sleeve.

Referring now to the second form of coupling C1, an article of manufacture is provided in the form of an elongated sleeve 11' of arcuate cross section having coextensively abutted edges as shown in FIG. 6a. In this embodiment, the edges 12' and 13' of the flange 18' are made for tongue and groove interengagement. This is a registered engagement that prevents radial displacement of the edges and which simultaneously limits the constriction of the sleeve 11 to establish predetermined inner and outer diameters of the right cylinder reformation of the sleeve.

Referring now to the third form of coupling C2, an article of manufacture is provided in the form of an elongated sleeve 11" of arcuate cross section having partially abutted edges with overlapped engagement as shown in FIG. 7a. In this embodiment, the edges 12" and 13" are disposed as they are in the first form above described, and in addition there is a chamfer at 21 in edge 12" and into which the tapered extension 22 of edge 13" is crimped as by means of a pliers or the like. The extension overlies the chamfer and ensures a ring structure surrounding the wire passage through the coupling.

Referring now to the fourth form of coupling C3, an article of manufacture is provided in the form of a substantially rigid elongated slotted sleeve 111 of arcuate cross section having spaced edges 112 and 113, and having a flange 118 initially formed at one edge to be subsequently deformed to overlie the other edge, thereby closing the flange into an encompassing ring. The initial formation is shown in FIG. 8 wherein the slotted body is adapted to receive wiring laterally therethrough. And, the reformed condition of the slotted body is shown in FIG. 8a wherein the end portions of the body remain slotted and the radial extension 22' at edge 113 is reformed to engageably overlap the chamfer 21' at edge 112. The ring formation captures the wiring within the tubular coupling.

From the foregoing it will be seen that an enlarged article of manufacture is provided for embracing a bundle of wiring over which it is reformed and reduced in size so as to establish a right cylinder sleeve. It is significant that the sleeve of initially arcuate cross section has an interrupted perimeter until reformed so as to have a continuous circumference, there being a transformation of the sleeve from an embracing configuration to that of a surrounding configuration, and all of which enables the flex conduit repair without removal of and/or re-running of the previously installed wiring.

Having described only typical preferred forms and applications of my invention, I do not wish to be limited or restricted to the specific details herein set forth, but wish to reserve to myself any modifications or variations that may appear to those skilled in the art as set forth within the limits of the following claims:

I claim:

1. A repair coupling for rejoining separated ends of flexible electrical conduit sections comprised of helically wrapped loosely interlocked strip and with wiring extending continuously therethrough and therebetween, and including; an elongated maleable body of shell form having an initial semi circular arucate cross sectional configuration with inner and outer perimeter walls, said perimeter walls terminating at opposite normal ends and having coextensive juxtaposed edges initially spaced one from the other to establish a longitudinally disposed slot-shaped opening for the lateral reception of said wiring, at least a portion of said initially spaced juxtaposed edges of the maleable body being reformable into tubular configuration with overlapped engagement and with opposed stop shoulders thereof engaged to limit constriction of the diameter of said outer perimeter wall thereof for insertion into opposed ends of the separated conduit sections.

2. The repair coupling for electrical conduit as set forth in claim 1, wherein the outer perimeter wall of the body has helical thread members for threaded engagement within the helically wrapped strip.

3. The repair coupling for electrical conduit as set forth in claim 1, wherein the said juxtaposed opposed edges of the body walls have coextensive overlapped engagement.

4. The repair coupling for electrical conduit as set forth in claim 1, wherein the said juxtaposed opposed edges of the walls have coextensive abutted engagement limiting the constricted diameter of the tubular configuration.

5. The repair coupling for electrical conduit as set forth in claim 1, wherein the body of shell form is separated into like opposite end portions by a radial flange disposed normal to an axis of the body.

6. The repair coupling for electrical conduit as set forth in claim 1, wherein the body of shell form is separated into like opposite end portions by a radial flange disposed normal to an axis of the body, said flange having abuttable edges limiting the constricted diameter of the tubular configuration.

7. The repair coupling for electrical conduit as set forth in claim 1, wherein the body of shell form is separated into like opposite end portions by a radial flange disposed normal to an axis of the body, said flange having abuttable tongue and groove engagement limiting the constricted diameter of the tubular configuration.

8. The repair coupling for electrical conduit as set forth in claim 1, wherein the outer perimeter wall of the body has helical thread members for threaded engagement within the helically wrapped strip, wherein the said juxtaposed opposed edges of the body walls have coextensive overlapped engagement and with complementary stop shoulders limiting the constricted diameter of the tubular form, and wherein the body of shell form is separated into like opposite end portions by a radial flange disposed normal to an axis of the body, said flange having abuttable tongue and groove engagement limiting the constricted diameter of the tubular configuration.

9. The repair coupling for electrical conduit as set forth in claim 1, wherein the body is separated into like opposite end portions by a radial flange disposed normal to an axis of the body, wherein one of said juxtaposed opposed edges is chamfered at the periphery of said flange, and wherein the other one of said juxtaposed opposed edges is extended for overlapped engagement with said chamfer when said body shell is reformed into tubular configuration.

10. The repair coupling for electrical conduit as set forth in claim 1, wherein the body of shell form is separated into like opposite end portions by a radial flange disposed normal to an axis of the body, said flange comprising the said at least a portion of said body of shell form.

* * * * *